United States Patent
Duddy

(12) 
(10) Patent No.: US 6,364,779 B1
(45) Date of Patent: Apr. 2, 2002

(54) ALUMINUM PROPELLER SHAFT WITH CONSTANT VELOCITY JOINT

(75) Inventor: Michael P. Duddy, Goodrich, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/494,696

(22) Filed: Jan. 31, 2000

(51) Int. Cl.⁷ .................................................. F16C 3/00
(52) U.S. Cl. ...................................... 464/182; 464/183
(58) Field of Search ................................ 464/183, 182; 156/73.5

(56) References Cited

U.S. PATENT DOCUMENTS

| | | | |
|---|---|---|---|
| 2,559,485 A | | 7/1951 | Warner |
| 2,908,073 A | | 10/1959 | Dulin |
| 3,341,680 A | | 9/1967 | Rjabov et al. |
| 3,495,319 A | | 2/1970 | Finnegan |
| 3,973,715 A | * | 8/1976 | Rust ........................ 228/114.5 |
| 3,986,689 A | | 10/1976 | Maltby |
| 4,247,036 A | | 1/1981 | Salesse et al. |
| 4,331,280 A | * | 5/1982 | Terabayashi et al. .... 228/114.5 |
| 4,407,441 A | | 10/1983 | Aarts |
| 4,600,332 A | | 7/1986 | Sharp et al. |
| 4,699,310 A | | 10/1987 | Kohno et al. |
| 4,722,717 A | * | 2/1988 | Salzman et al. ............ 464/182 |
| 5,234,378 A | | 8/1993 | Helgesen et al. |
| 5,469,931 A | * | 11/1995 | Kawata et al. .............. 464/182 |
| 5,716,276 A | | 2/1998 | Mangas et al. |
| 5,720,319 A | | 2/1998 | Smith et al. |
| 5,858,142 A | * | 1/1999 | Tully et al. ................. 156/73.5 |
| 5,897,047 A | * | 4/1999 | Takei et al. ................. 228/114 |
| 6,083,108 A | * | 7/2000 | Grubish ....................... 464/182 |
| 6,113,499 A | * | 9/2000 | Braun et al. ................ 464/140 |

FOREIGN PATENT DOCUMENTS

| | | |
|---|---|---|
| GB | 0626779 | 7/1949 |
| IT | 614159 | 12/1960 |
| JP | 1-169115 | 12/1987 |

OTHER PUBLICATIONS

Editor, R. L. O'Brien; Book, The American Welding Society, Welding Processes, vol. II, 8$^{th}$ Edition; Article entitled Friction Welding, Chapter 23.

Pictures (2) of 1998 BMW Propeller Shaft.

* cited by examiner

Primary Examiner—Lynne H. Browne
Assistant Examiner—Aaron Dunwoody
(74) Attorney, Agent, or Firm—Harness, Dickey & Pierce, P.L.C.

(57) ABSTRACT

A driveline assembly for rotatably interconnecting a first power transmission device to a second power transmission device includes a propeller shaft, an adapter plate, a stub shaft and a constant velocity joint. The propeller shaft has a first end coupled to the adapter plate and a second end adapted to be drivingly coupled to the first power transmission device. The stub shaft includes a substantially cylindrical rod having a first end and a second end. The stub shaft further includes a flange radially extending from the first end of the rod wherein the flange is coupled to the adapter plate. The constant velocity joint is slidingly engaged and rotatably coupled to the second end of the stub shaft and the constant velocity joint is adapted to be coupled to the second power transmission device.

7 Claims, 3 Drawing Sheets

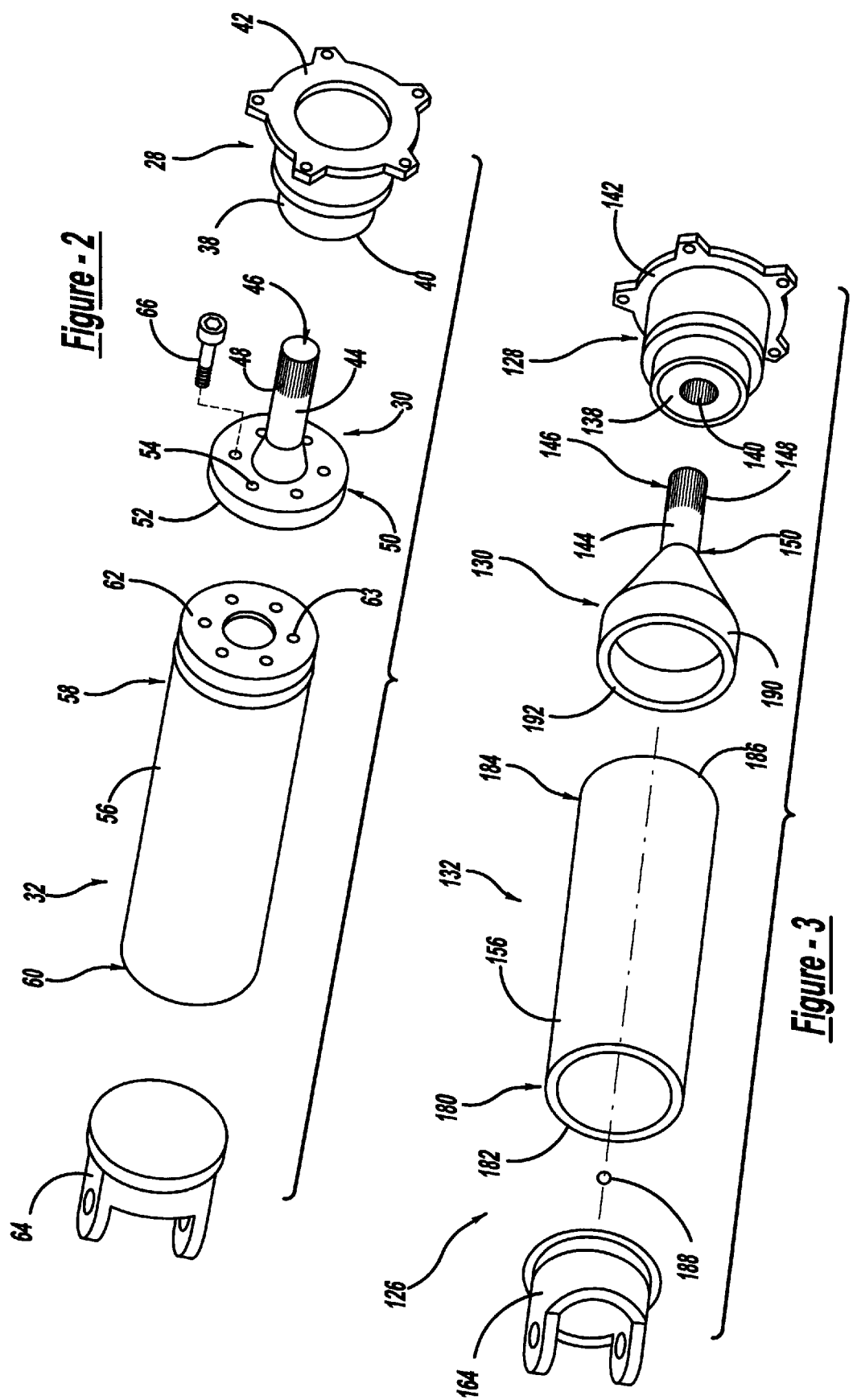

ALUMINUM PROPELLER SHAFT WITH CONSTANT VELOCITY JOINT

BACKGROUND OF THE INVENTION

1. Technical Field

The present invention generally relates to a vehicular drive shaft for transferring power in a motor vehicle. More particularly, the present invention pertains to a constant velocity joint used in conjunction with an aluminum propeller shaft in a driveline assembly.

2. Discussion

Most motor vehicles are equipped with a standard power train assembly including an engine, a transmission, a driveline assembly and driven wheels. A typical driveline assembly provides a power transfer path between an output shaft of the vehicle transmission or transfer case and the driving axle assembly. For example, the driveline of a rear wheel drive vehicle commonly includes a propeller shaft having a first universal joint for interconnecting the propeller shaft to the vehicle transmission and a second universal joint for interconnecting the propeller shaft to the drive axle assembly. In many applications, universal joints provide a suitable means for interconnecting shafts which rotate about noncollinear axes. However, certain power transmission applications require interconnecting shafts which rotate at angles closer to ninety degrees than standard universal joints commonly permit.

Depending on the vehicle's suspension characteristics, the axle assembly may pitch and roll during vehicle operation. Specifically, relatively large articulations between the axle assembly and the vehicle frame occur when the vehicle is operated off-road or under maximum acceleration. Accordingly, because the engine and transmission are fixedly attached to the vehicle frame, the driveline assembly must provide the requisite degree of freedom to tolerate movement of the axle assembly relative to the vehicle frame. Unfortunately, a standard universal joint is not suitable for these applications.

In front wheel drive applications, a constant velocity joint is commonly implemented to interconnect the propeller shaft and the vehicle transmission at angles exceeding the operating range of universal joints. However, these applications usually include combining a steel propeller shaft with a constant velocity joint. While the use of steel propeller shafts has been tolerated in front wheel drive applications, a strong desire exists to implement aluminum propeller shafts in rear wheel drive vehicles. Specifically, a substantial weight reduction may be realized by implementing the lighter material in long rear wheel drive propeller shaft applications.

Unfortunately, difficulty arises when attempting to interconnect a typical constant velocity joint with an aluminum propeller shaft. Specifically, constant velocity joints commonly include steel radial mounting flanges at one end and an internally splined hub at the other end. Accordingly, to obtain the desired weight reduction and driveline function, the propeller shaft must mount to one of the constant velocity joint ends. A mount directly to the steel flange is improbable because dissimilar metals such as aluminum and steel may not be joined using conventional Metal Inert Gas (MIG) or Tungsten Inert Gas (TIG) welding techniques. In addition, a mount to the internally splined hub requires an externally splined shaft constructed from a material possessing sufficient torsional strength. While an externally splined aluminum shaft could be easily welded to an aluminum propeller shaft, aluminum does not exhibit the torsional strength required for use with the constant velocity joint.

SUMMARY OF THE INVENTION

Accordingly, it is an object of the present invention to provide a an aluminum propeller shaft with a constant velocity joint for use in rotational power transmission applications.

In the preferred embodiment, a driveline assembly for rotatably interconnecting a first power transmission device to a second power transmission device includes a propeller shaft, an adapter plate, a stub shaft and a constant velocity joint. The propeller shaft has a first end coupled to the adapter plate and a second end adapted to be drivingly coupled to the first power transmission device. The stub shaft includes a substantially cylindrical rod having a first end and a second end. The stub shaft further includes a flange radially extending from the first end of the rod wherein the flange is coupled to the adapter plate. The constant velocity joint is slidingly engaged and rotatably coupled to the second end of the stub shaft and the constant velocity joint is adapted to be coupled to the second power transmission device.

Further areas of applicability of the present invention will become apparent from the detailed description provided hereinafter. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

FIG. 2 is an exploded perspective view of a first embodiment of a driveline constructed in accordance with the teachings of the present invention;

FIG. 3 is an exploded perspective view of a second embodiment of a driveline constructed in accordance with the teachings of the present invention;

DETAILED DESCRIPTION OF THE PREFERRED EMBODIMENT

Figure 1:
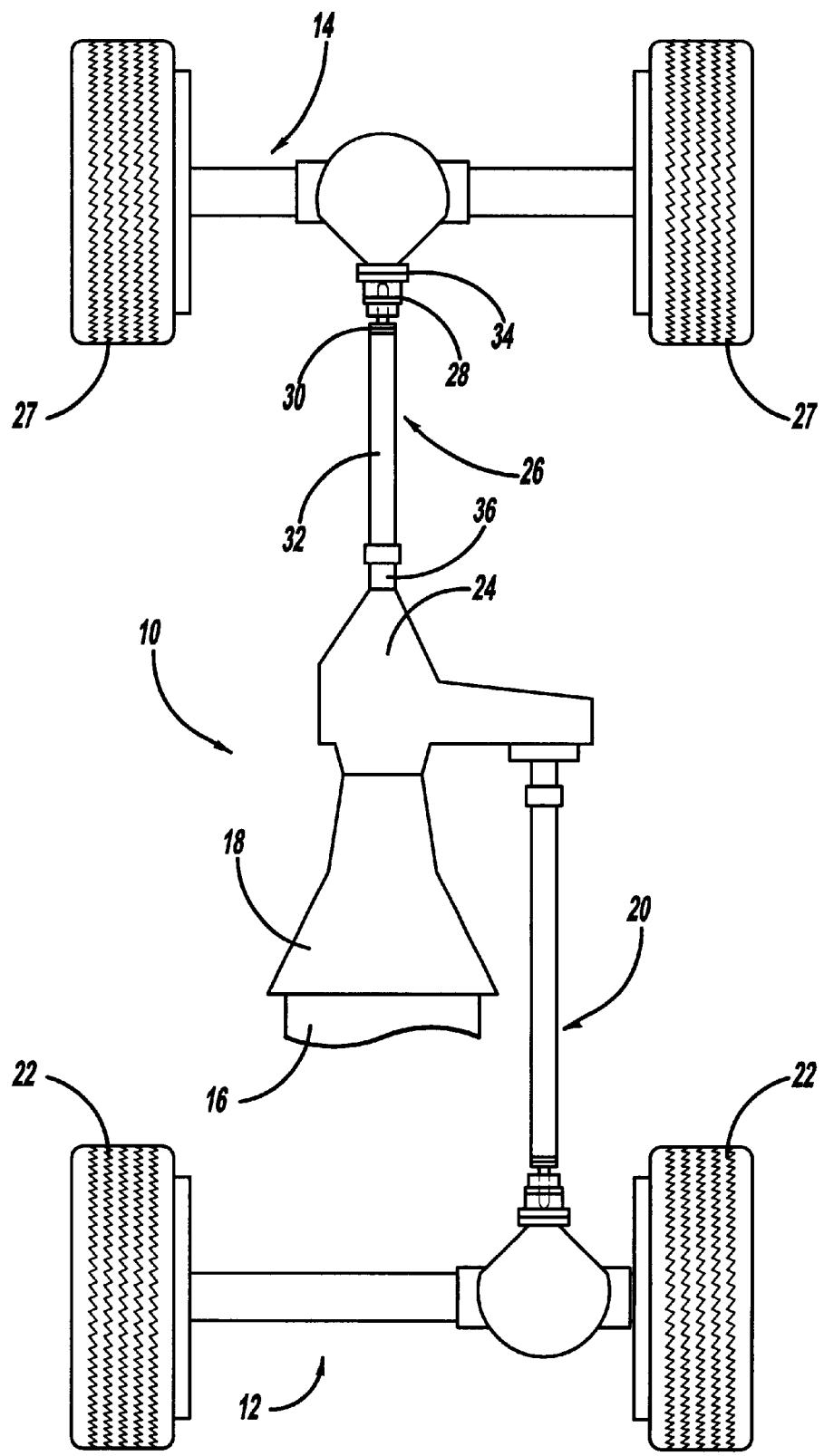
FIG. 1 illustrates the powertrain of a four wheel drive vehicle equipped with the driveline of the present invention.

Referring to FIG. 1, an exemplary motor vehicle 10 equipped with four wheel drive includes a first axle assembly 12 and a second axle assembly 12 both drivable from a source of power such as an engine 16, through a transmission 18 which may be of either the manual or automatic type. A first driveline assembly 20 drivingly interconnects a pair of first wheels 22 to a transfer case 24 attached to transmission 18. In similar fashion, a second driveline assembly 26 drivingly interconnects a second pair of wheels 27 located at each end of second axle assembly 14 to transfer case 25. One skilled in the art will appreciate that while only second driveline assembly 26 will be described in detail, the present invention is applicable to driveline assemblies used in two wheel drive, four wheel drive, and front wheel drive applications.

As shown in FIGS. 1 and 2, second driveline 26 includes a constant velocity joint 28, a stub shaft 30 and a propeller shaft 32 for drivingly interconnecting an input shaft 34 of second axle assembly 14 with an output shaft 36 of transfer case 24. The constant velocity joint 28 includes a hub 38 having an internally splined receptacle 40 drivingly engaged with stub shaft 30. Constant velocity joint 28 further includes a radially extending mounting flange 42 adapted for interconnection with input shaft 34. One skilled in the art will appreciate that constant velocity joint 28 need not be equipped with flange 42 to properly transmit torque. For example, a constant velocity joint equipped with a male spline instead of the flange 42 would function properly without departing from the scope of the present invention.

Stub shaft 30 includes a generally cylindrical rod 44 having a first end 46 with an external spline 48 slidably disposed within receptacle 40 of hub 38 and a second end 50 with a mounting flange 52 extending radially therefrom. To properly transmit torque therethrough, stub shaft 30 is preferably constructed from a high strength material such as steel. One skilled in the art will appreciate that the splined interconnection may function to provide an axial degree of freedom between the second axle assembly 14 and the transfer case 24 thereby permitting articulation of second axle assembly 14 relative to the vehicle frame without binding second driveline 26. The mounting flange 52 includes a plurality of fastener apertures 54 useful for interconnecting the stub shaft 30 and propeller shaft 32 as will be described in greater detail hereinafter. Furthermore, propeller shaft 32 is generally cylindrical in shape having a first end 58 and a second end 60. An adapter plate 62 and a yoke 64 are coupled to first end 58 and second end 60, respectively. In an attempt to achieve the design goal of producing a lightweight driveline assembly, propeller shaft 32 is preferably constructed from a material such as aluminum exhibiting high formability and strength characteristics in addition to a low mass per unit volume. However, as described earlier, conventional welding techniques such as MIG or TIG processes are ineffective when attempting to join dissimilar metals such as aluminum and steel.

Accordingly, the first embodiment of the present invention utilizes the aluminum adapter plate 62 for interconnecting propeller shaft 32 and stub shaft 30. Adapter plate 62 is a generally planar, circular member having an outside diameter substantially equivalent to the outside diameter of propeller shaft 32. Adapter plate 62 further includes a plurality of apertures 63 positioned to cooperate with apertures 54 extending through flange 52 of stub shaft 30. In the preferred embodiment, apertures 63 include an internal thread such that an externally threaded fastener 66 may be disposed within apertures 54 and threadingly engaged with adapter plate 62. One skilled in the art will appreciate that yoke 64 is preferably constructed from aluminum and is fixedly attached to the second end 60 of propeller shaft 32 in a manner commonly known in the art such as welding. It should be appreciated that the axial positioning of stub shaft 30 and constant velocity joint 28 within second driveline assembly 26 may be reversed without departing from the scope of the present invention. Specifically, flange 42 of constant velocity joint 30 may be fastened directly to adapter plate 62 while flange 52 of stub shaft 30 is coupled to input shaft 34 of second axle assembly 14.

Referring to FIG. 3, a second embodiment of the driveline of the present invention is presented at reference numeral 126. One skilled in the art will appreciate that driveline 126 functions in a manner substantially similar to the first embodiment previously described in detail. Accordingly, like components will be labeled with reference numerals increased by 100.

Driveline assembly 126 includes a constant velocity joint 128, a propeller shaft 132, a yoke 164 and a stub shaft 130 for drivingly interconnecting an input shaft 34 of second axle assembly 14 with an output shaft 36 of the transfer case 24. The constant velocity joint 128 includes a hub 138 having an internally splined receptacle 140 drivingly engaged with stub shaft 130. Constant velocity joint 128 further includes a radially extending mounting flange 142 adapted for interconnection with input shaft 34.

In similar fashion to the first embodiment, the second embodiment 126 of the present invention preferably incorporates aluminum or an aluminum alloy as the material for propeller shaft 132. Accordingly, the challenge of attaching a steel stub shaft to an aluminum tube is still present. However, instead of implementing an adapter plate and a flange as taught in the first embodiment, the second embodiment of the present invention utilizes a joining process known as friction welding.

With continued reference to FIG. 3, propeller shaft 132 includes a first end 180 having a first end face 182 and a second end 184 having a second end face 186. As shown, second end face 186 is preferably orthogonally orientated relative to the longitudinal axis 188 of propeller shaft 132. Stub shaft 130 includes a generally cylindrical rod 144 having a first end 146 with an external spline 148 slidably disposed within receptacle 140 of hub 138 and a second end 150 having a flared body 190 terminating at a friction face 192. One skilled in the art will appreciate that yoke 164 is preferably constructed from aluminum or an aluminum alloy which may be conventionally welded to first end face 182. On the contrary, rod 144 of stub shaft 130 has a relatively small outer diameter and is preferably constructed from steel to withstand the high torsional loads encountered during operation. According to the second embodiment of the present invention, driveline assembly 126 is completed by friction welding second end face 186 of propeller shaft 132 to friction face 192 of stub shaft 130.

Figure 4:
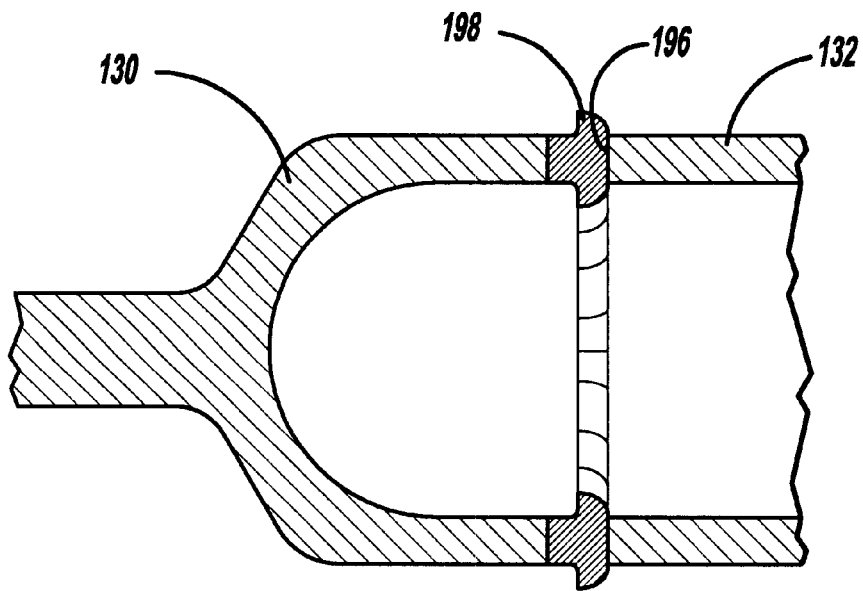
FIG. 4 is a partial cross-sectional view of the second embodiment of the driveline depicted in FIG. 3.
Figure 5:
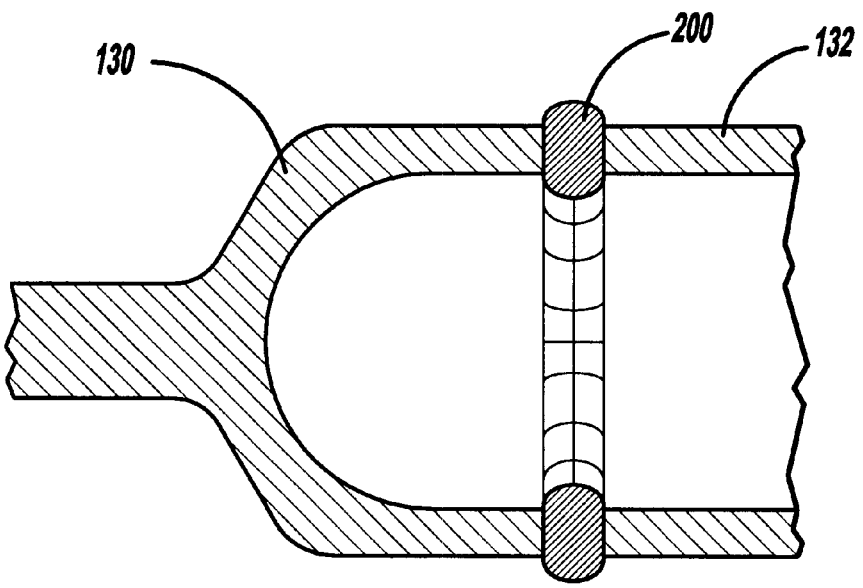
FIG. 5 is a partial cross-sectional view of the second embodiment of the driveline depicted in FIG. 3 constructed with an set of alternate materials.

Friction welding involves joining dissimilar metals by rubbing the components in relation to each other with sufficient speed and compressive force to create localized melting. Specifically, and in reference to FIGS. 3 and 4, friction face 192 is rotated relative to second end face 186 thereby generating heat at the interface of the surfaces. As the friction face 192 and second end face 186 continue to move relative to one another, a zone 194 is created where molten portions of at least one of the components are located. One skilled in the art will appreciate that the melting points of the materials to be joined determine if the zone 194 will contain melted material from one or both components. After a sufficient volume of melted material has been created, the relative rubbing is stopped and the components are allowed to cool. The friction weld is now complete and propeller shaft 132 is coupled to stub shaft 130. As best seen in FIG. 4, friction welding produces a joint containing parent aluminum from propeller shaft 132, parent steel from stub shaft 130 and a recently melted and subsequently solidified aluminum region 196. Region 196 includes a rolled portion 198 created by axially forcing the propeller shaft 132 towards the stub shaft 130 as the components are rotated relative to one another. FIG. 5 depicts a condition where each of the dissimilar materials have melted to form a mixing zone 200. As referenced earlier, the mixing zone 200 forms when each of the parent materials have similar melting points.

What is claimed is:

1. A driveline assembly for rotatably interconnecting a first power transmission device to a second power transmission device, the driveline assembly comprising:

a propeller shaft having a first end and a second end, said first end adapted to be drivingly coupled to the first power transmission device;

an adapter plate coupled to said second end of said propeller shaft, said adapter plate positioned transverse to an axis of said propeller shaft, and said adapter plate having a plurality of apertures for receiving fasteners positioned within the diameter of said propeller shaft;

a stub shaft having a first end and a second end, said stub shaft including a flange radially extending from said first end wherein said flange includes a plurality of apertures for receiving fasteners and is coupled to said adapter plate via a plurality of fasteners passing through said plurality of apertures; and a constant velocity joint rotatably coupled to said second end of said stub shaft, said constant velocity joint adapted to be coupled to the second power transmission device.

2. The driveline assembly of claim 1 wherein said second end of said stub shaft is slidably engaged with said constant velocity joint.

3. The driveline assembly of claim 1 wherein said propeller shaft is constructed from a first material and said stub shaft is constructed from a second material.

4. The driveline assembly of claim 1 further including a yoke coupled to said first end of said propeller shaft.

5. A driveline assembly for rotatably interconnecting a first power transmission device to a second power transmission device, the driveline assembly comprising:

a propeller shaft having a first end and a second end, said propeller shaft manufactured from a first material, said first end adapted to be drivingly coupled to the first power transmission device;

a constant velocity joint having a receptacle, said constant velocity joint adapted to be drivingly interconnected to the second power transmission device; and a stub shaft having a first end and a second end, said stub shaft manufactured from a second material which is dissimilar to said first material and one of said materials being aluminum, said first end disposed within said receptacle thereby drivingly interconnecting said stub shaft and said constant velocity joint, and a weld formed between said second end of said stub shaft and said second end of said propeller shaft where said second end of said stub shaft is frictionally welded to said second end of said propeller shaft.

6. The driveline assembly of claim 5 wherein said first end of said stub shaft includes an external spline engaging said receptacle.

7. The driveline assembly of claim 6 wherein said second end of said stub shaft includes a friction face frictionally welded to said second end of said propeller shaft.

* * * * *